Figure 1:
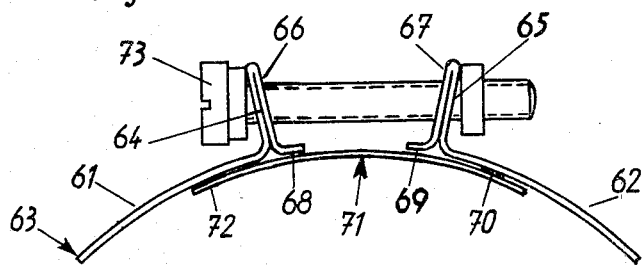

June 12, 1962   W. HENNING   3,038,230

PIPE STRAP OR HOSE CLAMP

Filed May 9, 1960

INVENTOR

W. Henning

ATTYS.

United States Patent Office 3,038,230
Patented June 12, 1962

3,038,230
PIPE STRAP OR HOSE CLAMP
Wolfgang Henning, Niedermarsberg, Westphalia, Germany
Filed May 9, 1960, Ser. No. 37,540
Claims priority, application Germany May 12, 1959
4 Claims. (Cl. 24—282)

This invention relates to a pipe strap particularly a hose clamp.

It has already been proposed to provide the lugs at the two ends of a clamping strap, which are pulled together by a bolt, with extensions folded back against the lug. The ends of these extensions of both lugs are again bent over at right angles in such a way that one of the ends bridges the gap between the lugs and hence provides a sliding base, whereas the end of the extension on the other lug is reflexed under the strap adjacent the associated lug in such a way that said end will rest on the web-like base formed by the end of the extension of the other lug.

This known construction of a hose clamp has the drawback that the material of the hose tends to squeeze into the wedge-shaped space formed between one of the lugs and its extension at the point where the lug forms a small radius at the junction with the strap and the extension forms a similar small radius at the junction with the web-shaped base. Another disadvantage is that the lug with the inwardly reflexed extension which tucks under the associated strap end is not supported to withstand the tilting moment of the clamping force which arises when the bolt is tightened.

The present invention overcomes these disadvantages by bending the ends of the extensions of both the lugs towards each other at the level of the strap and by providing a separate web in the form of a length of strap underneath the lugs and their associated extensions and off-angled ends, said web being secured, preferably by welding, to the underside of only one end of the strap.

This construction of a hose clamp has the advantage that the inward tilting moments of the closing forces which the bolt applies to the lugs are supported in a desirable manner by the extensions and their off-angled ends. This arises because the tightening of the bolt forces the lug extensions which are originally bent back into contact with the faces of the lugs away from the associated lugs, thus to form a kind of bipod strut which prevents the lug from tipping when the pull of the bolt increases. The presence of the web-like member underneath assists this straddling motion because the off-angled ends of the lug extensions can ride along the web which provides a sliding base. On the other hand, the presence of the web will naturally prevent the material of the hose from squeezing into the opening between the lug and its extension so that the tightness of the joint cannot be thus impaired. In the further development of this inventive thought, and since it will be frequently desirable that the strap should fit tubes of different diameters, it is furthermore proposed to form no lug on one end of the strap but to extend the latter sufficiently to replace the web which pushes underneath the strap end on the other side. The second lug required for tightening the strap can then be formed on the end of a separate section of strap material of which the other end has a narrow tongue insertable into any one of several slots provided in the strap and affixable by bending back the projecting end of the inserted tongue on the inside of the strap. In this alternative form of construction the ends of the extensions of both lugs may likewise be off-angled towards each other in such a way that the advantages afforded by the first described construction are still secured. Moreover, this alternative embodiment affords the additional advantage that the effective length of the strap can be adjusted stepwise to different diameters of hose by inserting the tongue of the separate section of strap material into an appropriately located slot in the actual strap and by bending over the projecting end of the inserted tongue against the inside of the strap in such a way that the strap and the strap section thus inserted will appropriately encircle the tube or hose in question.

Figure 2:
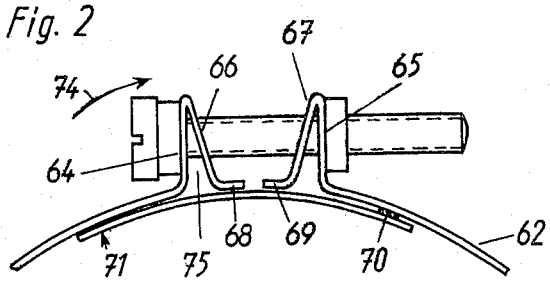
Figure 4:
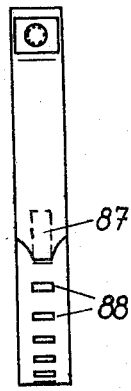
Figure 3:
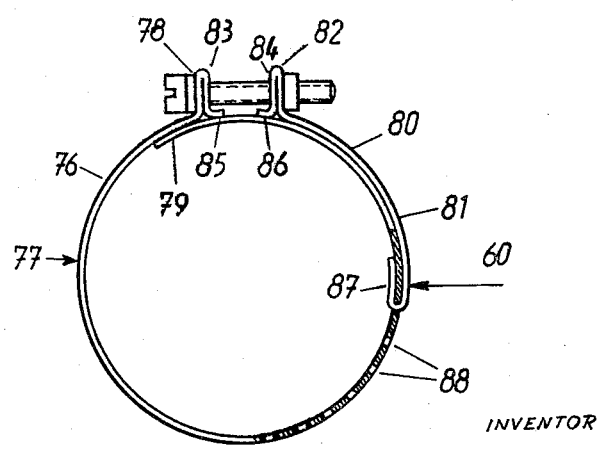

Illustrative embodiments of the invention will be described with reference to the accompanying drawings in which:

FIGURE 1 is a fragmentary side view of a hose clamp in which the ends of the extensions of both lugs are bent towards each other, the drawing showing the strap prior to being tightened, FIGURE 2 is the embodiment illustrated in FIGURE 1, showing the strap in an advanced stage of tightening, FIGURE 3 is a side view of another embodiment provided with a plurality of slots in the strap for attachment of a special length of strap material with a terminal reflexed lug, FIGURE 4 is an edge-on view of the embodiment shown in FIGURE 2 seen in the direction of arrow 60 in FIGURE 3.

With reference now to the embodiment shown in FIGURES 1 and 2 it will be seen that lugs 64, 65 are formed on the ends 61, 62 of strap 63 by bending said ends outwards, practically at right angles to the strap. The lugs have extensions 66, 67 which are bent over inwardly until they touch the lug. The extensions 66, 67 are sufficiently long for their ends 68, 69 to extend beyond the point where the lugs are formed on to the strap ends. These ends 68, 69 are now off-angled inwardly towards each other in such a way as to align with the ends 61, 62 of the actual strap. Near lug 65 a sliding web member 71 is bonded by a spot weld 70 with the inside face of one end 62 of the strap, the sliding web member consisting of a length of strap material and extending with its free end 72 underneath the other cooperating strap end 61.

When the lugs 64, 65 are pulled together by the clamping bolt 73 the resultant thrusts and tilting moments indicated in FIGURE 2 cause the extension to be forced away from the inner face of its associated lug, thus giving rise to the formation of a bipod strut which prevents the lug from tilting in the direction of arrow 74. The presence of the sliding web 71 permits the off-angled ends 68, 69 of lug extensions 66, 67 to ride along the surface of the web which thus facilitates this straddle motion. On the other hand, the presence of the sliding web prevents portions of the hose from being squeezed into the angle 75 which opens between the extension and its associated lug.

In the embodiment shown in FIGURES 3 and 4 only one end 76 of the strap 77 has a lug 78, whereas the other end 79 of the strap 77 is not provided with a lug but extends to form a sliding web. However, at one end 80 of a separate section of strap material 81 is a second lug 82, shaped in the same way as lug 78 and generally conforming with the construction of the lugs shown in FIGURES 1 and 2. Each of the said two lugs has an extension 83, 84 with an off-angled end 85 and 86. The other end of the separate strap section 81 has a narrow tongue 87 adapted for insertion into one of several slots 88 in strap 77 in such a way that the tongue end projecting from the inside of the slot can be folded back against the inside face of the strap 77.

The particular slot 88 into which the tongue 87 of the separate strap section 81 is actually inserted depends upon the girth of the hose which the strap is intended to encircle.

I claim:

1. A hose clamp which comprises an annular strap having two adjacent ends and carrying two lugs adjacent to said ends, a bolt adapted to pull said lugs together and thereby tighten said strap, and in which at least one of said lugs is formed integral with one of said ends and each lug has a base portion extending outwards with respect to the strap, and an extension bent over into surface contact with said base portion and extending inwards with respect to said strap, an extremity of said extension being bent at right angles to the rest of the extension and towards the other one of said lugs and in the direction of said strap, said strap further comprising a web extending between and inwardly of said lugs with respect to the annular strap and having an outer surface in contact with and slidable relatively to each aforesaid extremity, said extensions being angularly movable with respect to said base portions and thereby adapted to separate from said base portions when said lugs are pulled together by said bolt.

2. A hose clamp as claimed in claim 1, in which one end of the web is attached to the inner surface of the strap near one end of said strap whereas the other end of said web is freely slidable on the inner surface of the other end of said strap, and each of said lugs is integral with a respective end of said strap.

3. A hose clamp as claimed in claim 2, comprising a weld deposit attaching the web to the inner surface of the strap.

4. A hose clamp according to claim 1, characterised in that one end of the strap is extended to form a web projecting underneath the cooperating other strap end, on which one of said lugs is formed, and that the other one of said lugs, required for tightening the strap is formed on the end of a separate piece of strap material of which the other end has a narrow tongue insertable into any one of a plurality of slots in the strap in such a way that the projecting end of the tongue can be folded back against the inside of the strap.

References Cited in the file of this patent

UNITED STATES PATENTS

| 1,133,195 | Teeter | Mar. 23, 1915 |
| 1,172,690 | Erickson | Feb. 22, 1916 |
| 1,510,394 | Frazier | Sept. 30, 1924 |

FOREIGN PATENTS

| 896,003 | France | Apr. 17, 1944 |
| 712,335 | Great Britain | July 21, 1954 |